July 9, 1935.  J. H. ADAMS  2,007,237
DUAL CARVING FORK
Filed Feb. 12, 1934
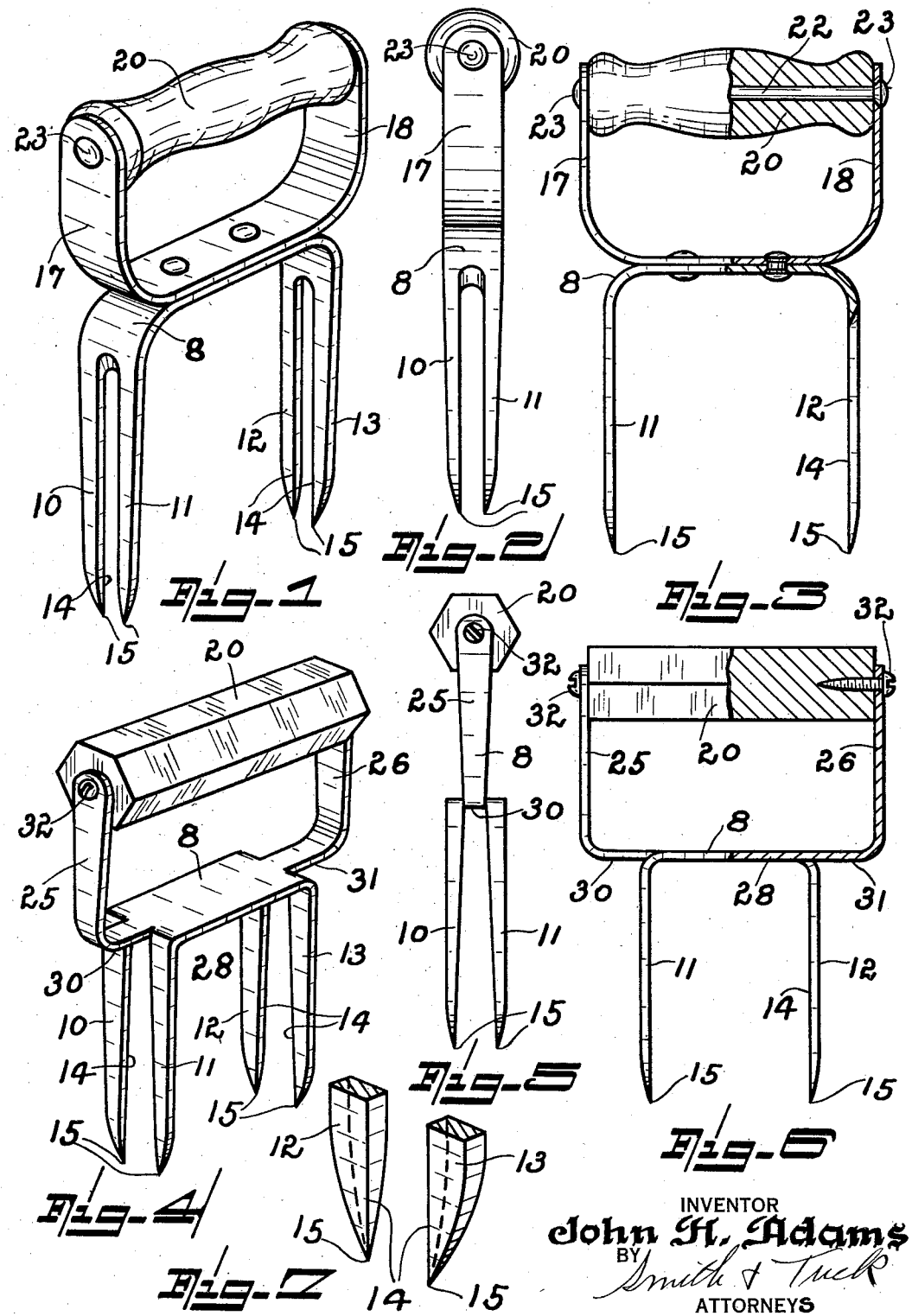

Patented July 9, 1935

2,007,237

UNITED STATES PATENT OFFICE 2,007,237

DUAL CARVING FORK

John H. Adams, Seattle, Wash.

Application February 12, 1934, Serial No. 710,929

2 Claims. (Cl. 30—5)

My present invention relates to the art of meat carving devices and more particularly to a dual carving fork.

There are indeed a few people who have not at one time or another experienced considerable difficulty in the carving of meat, particularly when served on the table. This difficulty is aggravated by the fact that the average carving fork has its tines spaced but a short distance apart and if the meat is yielding or particularly, in the case of a fowl, if the meat is well done, it is very difficult indeed to hold the roast securely while carving with the usual carving fork. It is to overcome this difficulty that I have provided my dual carving fork which consists essentially in two spaced pairs of tines which are fixedly secured to a handle normally disposed at right angles thereto which has considerable over-all extent so that once a carving fork is securely anchored in the roast the position of the roast can be easily maintained during the carving operation. I have purposely arranged my device so that in case the roast be a fowl the spaced tines can be so placed that each pair of tines straddle the breast bone and are of such a shape that it can be pressed down thru the thin bone of the breast plate when it joins the breast bone. To facilitate this operation I have provided that the points of each of the tines be so shaped that there will be no tendency to crowd away from the breast bone and thus a device is provided that can be easily placed even on the most well done fowl.

The principal object of my present invention is to provide a carving fork having spaced pairs of tines with a handle substantially joining these two sets of tines so as to make the handling of a roast easier. A further object of my present invention is to provide a device in which the handle supports form a shield much after the fashion of a hilt on a saber so that there is much less likelihood of a knife slipping and cutting the carver's hand.

A further object is the provision of tines having their points so arranged as to facilitate the piercing of the breast bone of a fowl.

Other and more specific objects will be apparent from the following description taken in connection with the accompanying drawing, wherein Figure 1 shows in perspective one preferred embodiment of my invention. Figure 2 is an end elevation of the same. Figure 3 is a side elevation of the same, partly in section to better illustrate the construction. Figure 4 represents a modified form of my device which will lend itself to cheaper production costs and still be very suitable for roast meats and the like. Figure 5 is an end elevation of the device shown in Figure 4. Figure 6 is a side elevation of Figure 4, certain parts being shown in section to better illustrate the construction. Figure 7 is a fragmentary perspective view illustrating more in detail the points arrangement employed on the tines of my fork.

Referring to the drawing, throughout which like reference characters indicate like parts, 8 designates the frame of my knife. This is provided with two downwardly extending ends each of which is bifurcated to provide the tines 10—11 and 12—13 respectively. The metal of which frame 8 is made should be of fairly heavy weight so that the finished tines will have the strength of the heavier types of carving forks, in fact, they should possibly exceed that strength. As the tines are forced downwardly over the breast bone of a fowl there is a marked tendency to crowd the two tines forming each pair away from each other. To counteract this tendency it is desirable that the tines have a rectangular cross section so as to provide the maximum resistance to distortion and further to provide a chisel like point on each tine. The exact formation of this point will be best observed from Figures 1, 2, 4, 5 and 7. Figure 7 shows in perspective the tine tips taken as viewing tines 12 and 13 in Figure 1. Here the inner edge 14 is a straight line clear to the very point, with the other three corners of each tine converging near the lower limit of the tine to the common point 15. Now, it should be remembered that in a fowl, for instance, the tine bone next adjacent the breast bone proper slopes downwardly on each side from the breast bone bridge and tends to act as a wedge to spread the tines. With the construction shown, however, with the inner line of the tines a straight line there is a very marked resistance to any spreading action. This spreading action is further prevented by having a sharp point rather than a wedge point, so that the initial puncture of the bone can be made with less pressure.

Secured to frame 8 may be any preferred form of handle. The type illustrated however has proven the most desirable and consists essentially of upwardly extending leg members 17 and 18 which enclose handle 20. A thru rod 22 passing thru the handle is preferably riveted on the outside of each of the members 17 and 18 as is indicated at 23. It has been found desirable in this connection to have the guard portion of handle support members 17 and 18 of greater outward extent than the tines themselves. This is brought out rather clearly in Figures 3 and 6 of the drawing.

In my present illustrations I have shown the handle support member as a separate piece in Figures 1, 2 and 3 and have riveted the same to frame 8. In the modified form, however, in Figures 4, 5 and 6 I have illustrated the handle support members as 25 and 26 being formed of the metal normally cut away from between the two tines, assuming the entire device be made from a single piece of flat stock. In order to provide the guard effect, however, I prefer that members 25 and 26 before they are turned up to support the handles be formed as a prolongation of the frame proper 28 so as to provide guard portions 30 and 31. I have further illustrated the modified form as having tines that diverge slightly from each other. This construction would not be desirable in a form intended to pierce the breast bone of a fowl but it is quite satisfactory when used on roast meat and the like. I have further illustrated the handle 20 as being secured in place by wood screws 32 instead of the thru rod as 22 as illustrated in the heavier type of construction.

The foregoing description and the accompanying drawing are believed to clearly disclose a preferred embodiment of my invention but it will be understood that this disclosure is merely illustrative and that such changes in the invention may be made as are fairly within the scope and spirit of the following claims.

I claim:

1. The combination with an inverted, U-shaped frame comprising two spaced, flat, slotted legs forming two parallel pairs of tines, each of said tines being substantially rectangular in cross section, the three outer edges of each tine converging to a point at the end of a straight inner edge, of a U-shaped handle frame rigid with the inverted U-shaped frame and of greater length than the latter, whereby the ends of the handle frame project beyond the inverted U-shaped frame to form a hand guard, and a handle mounted in the U-shaped frame.

2. The combination with an inverted U-shaped frame comprising spaced slotted legs forming two pairs of tines, of an integral U-shaped handle frame comprising arms severed from said legs to form said tines, said handle frame being of greater length than the inverted U-shaped frame whereby the ends of the former project beyond the latter to form a hand guard, and a handle mounted in the U-shaped frame.

JOHN H. ADAMS.